United States Patent
Muccini et al.

(10) Patent No.: US 9,690,349 B2
(45) Date of Patent: Jun. 27, 2017

(54) SYSTEMS AND METHODS FOR ENHANCING SYSTEM HOLD UP TIME USING REVERSE CHARGING OF POWER SUPPLY UNIT

(71) Applicant: Dell Products L.P., Round Rock, TX (US)

(72) Inventors: Mark A. Muccini, Georgetown, TX (US); Lei Wang, Austin, TX (US); John J. Breen, Harker Heights, TX (US)

(73) Assignee: Dell Products L.P., Round Rock, TX (US)

( * ) Notice: Subject to any disclaimer, the term of this patent is extended or adjusted under 35 U.S.C. 154(b) by 3 days.

(21) Appl. No.: 14/814,275

(22) Filed: Jul. 30, 2015

(65) Prior Publication Data

US 2017/0031410 A1 Feb. 2, 2017

(51) Int. Cl.
| | |
|---|---|
| G06F 1/00 | (2006.01) |
| G06F 1/26 | (2006.01) |
| G06F 1/30 | (2006.01) |
| H02J 7/00 | (2006.01) |

(52) U.S. Cl.
CPC ............. *G06F 1/30* (2013.01); *G06F 1/263* (2013.01); *H02J 7/007* (2013.01)

(58) Field of Classification Search
None
See application file for complete search history.

(56) References Cited

U.S. PATENT DOCUMENTS

| 4,040,247 A * | 8/1977 | Haydon | G04C 3/14 |
| | | | 307/66 |
| 7,061,212 B2 | 6/2006 | Phadke | |
| 7,898,111 B1 | 3/2011 | Pistel | |
| 8,710,820 B2 | 4/2014 | Parker | |
| 2005/0030772 A1* | 2/2005 | Phadke | H02M 1/4225 |
| | | | 363/71 |
| 2006/0146461 A1 | 7/2006 | Jones et al. | |
| 2010/0070782 A1* | 3/2010 | Majewski | G06F 1/30 |
| | | | 713/310 |

(Continued)

OTHER PUBLICATIONS

International Search Report and Written Opinion of the International Searching Authority, International Application No. PCT/US2016/042760, mailed Oct. 4, 2016.

*Primary Examiner* — Nitin Patel
(74) *Attorney, Agent, or Firm* — Jackson Walker L.L.P.

(57) ABSTRACT

An information handling system may include at least one information handling resource and a power supply unit having a bulk capacitor for storing charge. The power supply unit may be configured to convert an alternating current waveform received at an input of the power supply unit from an input source into a direct current voltage for delivering electrical energy to a power bus for providing electrical energy to the at least one information handling resource. Responsive to a loss of the input source, the power supply unit may charge the bulk capacitor from electrical energy present on the power bus and generated by at least one other power supply unit coupled to the power bus. Responsive to an indication of a failure of the at least one other power supply unit, the power supply unit may discharge the bulk capacitor to the power bus.

9 Claims, 4 Drawing Sheets

(56) References Cited

U.S. PATENT DOCUMENTS

| | | | |
|---|---|---|---|
| 2010/0148580 A1* | 6/2010 | Taniuchi | H02J 1/102 307/29 |
| 2010/0257529 A1* | 10/2010 | Wilkerson | G06F 1/263 718/102 |
| 2014/0001871 A1* | 1/2014 | Vogman | H02J 5/00 307/82 |
| 2014/0189379 A1 | 7/2014 | Faulkner et al. | |
| 2015/0177808 A1 | 6/2015 | Sarti | |

* cited by examiner

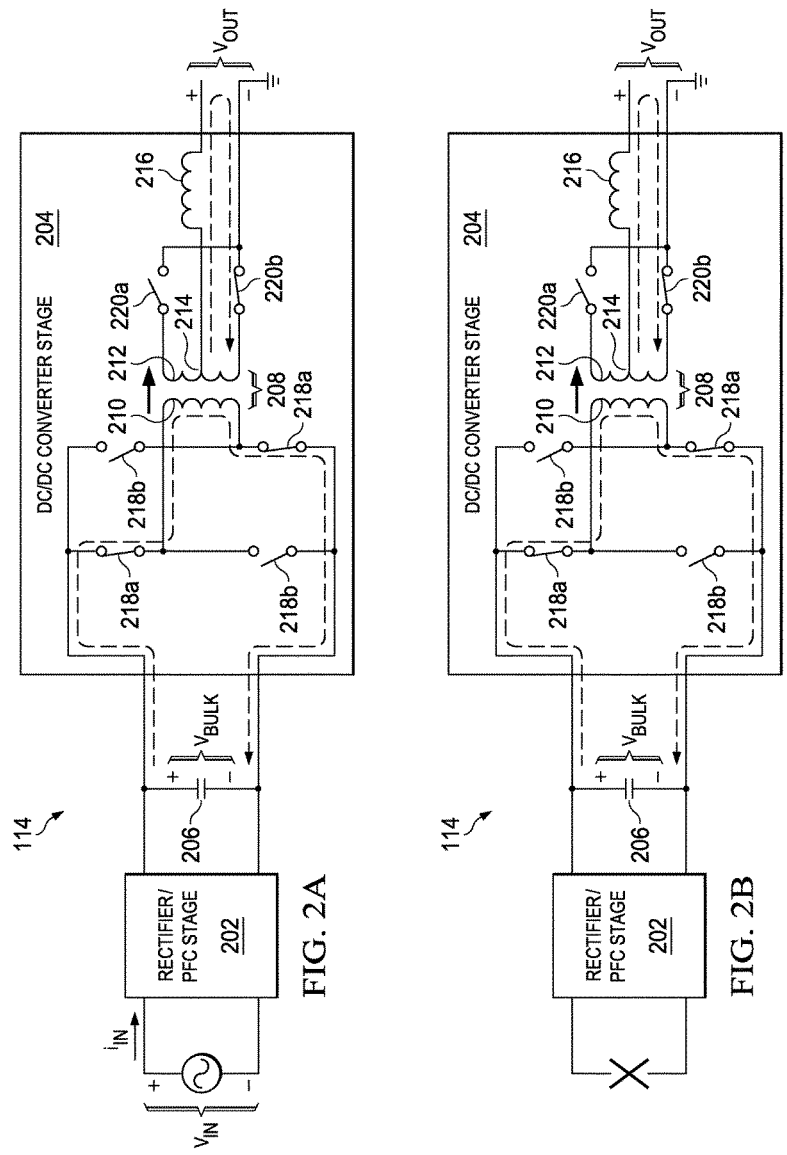

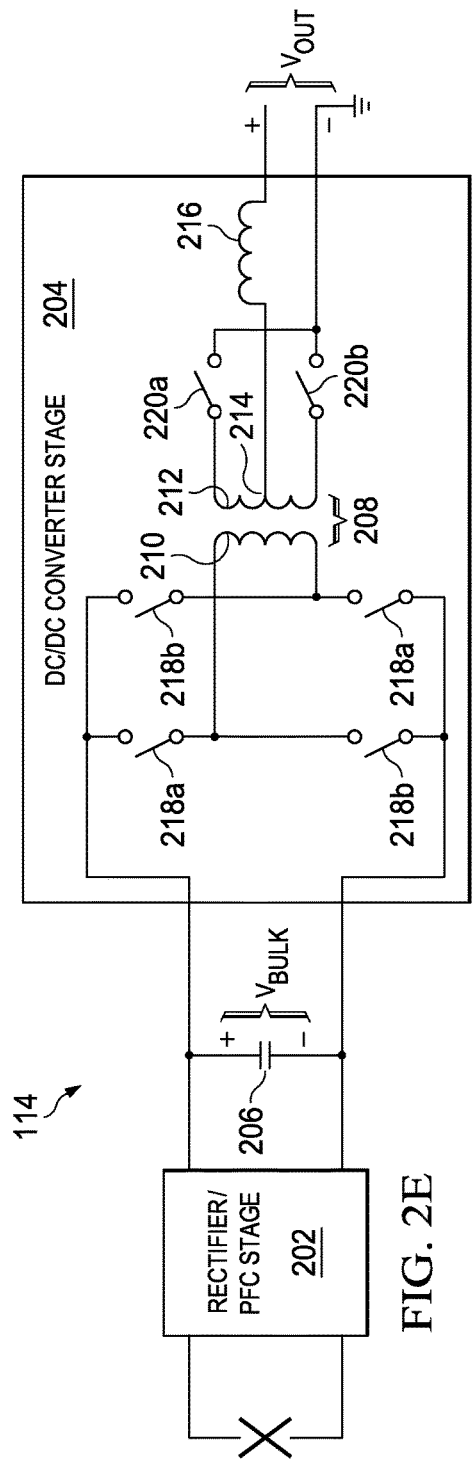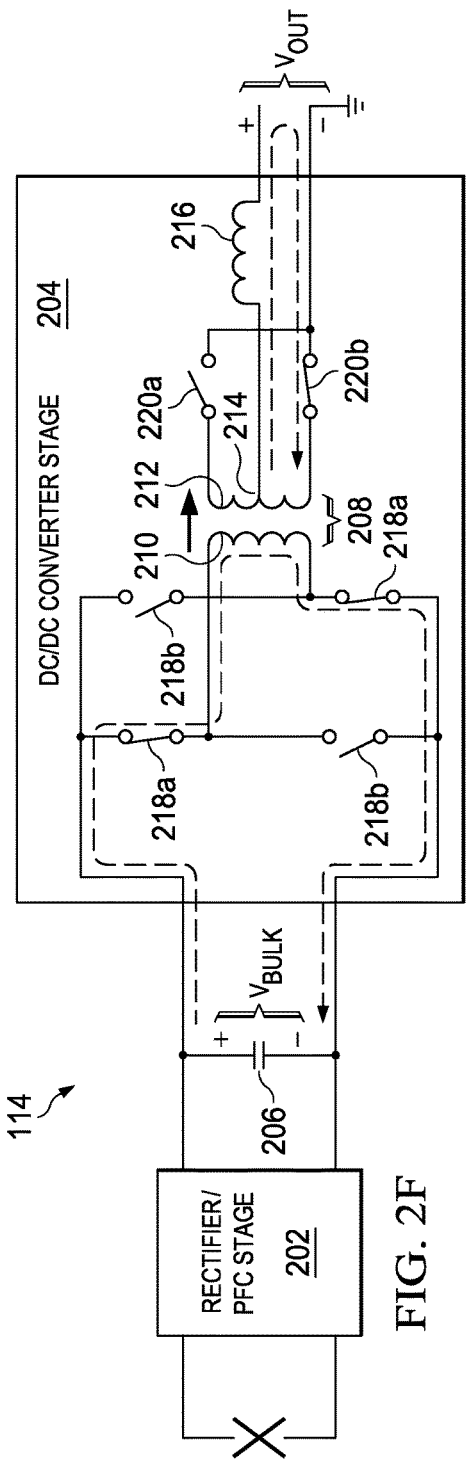
FIG. 2E
FIG. 2F

SYSTEMS AND METHODS FOR ENHANCING SYSTEM HOLD UP TIME USING REVERSE CHARGING OF POWER SUPPLY UNIT

TECHNICAL FIELD

The present disclosure relates in general to information handling systems, and more particularly to systems and methods for enhancing a system hold up time and/or other operational parameters of an information handling system using reverse charging of a power supply unit.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include one or more power supply units for providing electrical energy to components of the information handling system. Typically, a power supply unit is configured to operate from an input alternating current (AC) source and convert electrical energy received at the AC input to a (DC) direct current output. Thus, a power supply unit may include a rectifier and/or power factor correction stage configured to receive the input alternating current source and rectify the input alternating waveform to charge a bulk capacitor to a desired voltage. A direct-current-to-direct-current (DC-DC) stage may convert the voltage on the bulk capacitor to a direct-current output voltage provided to components of the information handling system in order to power components of the information handling system.

In traditional approaches, a power supply unit may be capable of, immediately after withdrawal of an alternating current input to the power supply unit, providing electrical energy at its output for a period of time known as a hold-up time or ride-through time. The hold-up period may provide enough energy to an information handling system to complete tasks before power is withdrawn due to the withdrawal of the alternating-current input. For example, in response to loss of an input alternating-current input, a write-back cache may flush data to a non-volatile memory, and the hold-up time may provide sufficient time for the write-back cache to use available electrical energy from the power supply unit in order to complete the cache flush before the power supply unit ceases generating an output voltage as a result of the withdrawal of the input alternating-current waveform.

SUMMARY

In accordance with the teachings of the present disclosure, the disadvantages and problems associated with existing approaches to providing hold-up time in an information handling system may be reduced or eliminated.

In accordance with embodiments of the present disclosure, an information handling system may include at least one information handling resource and a power supply unit having a bulk capacitor for storing charge. The power supply unit may be configured to convert an alternating current waveform received at an input of the power supply unit from an input source into a direct current voltage for delivering electrical energy to a power bus for providing electrical energy to the at least one information handling resource. Responsive to a loss of the input source, the power supply unit may charge the bulk capacitor from electrical energy present on the power bus and generated by at least one other power supply unit coupled to the power bus. Responsive to an indication of a failure of the at least one other power supply unit, the power supply unit may discharge the bulk capacitor to the power bus.

In accordance with these and other embodiments of the present disclosure, a power supply unit may include a bulk capacitor for storing charge, an input configured to receive an alternating current waveform received at an input of the power supply unit from an input source and circuitry. The circuitry may be configured to convert the alternating current waveform into a direct current voltage for delivering electrical energy to a power bus for providing electrical energy to at least one information handling resource. Responsive to a loss of the input source, the circuitry may charge the bulk capacitor from electrical energy present on the power bus and generated by at least one other power supply unit coupled to the power bus. Responsive to an indication of a failure of the at least one other power supply unit, the circuitry may discharge the bulk capacitor to the power bus.

In accordance with these and other embodiments of the present disclosure, a method may include, in a power supply unit for converting an alternating current waveform received at an input of the power supply unit from an input source into a direct current voltage for delivering electrical energy to a power bus for providing electrical energy to at least one information handling resource: (i) responsive to a loss of the input source, charging a bulk capacitor of the power supply unit from electrical energy present on the power bus and generated by at least one other power supply unit coupled to the power bus; and (ii) responsive to an indication of a failure of the at least one other power supply unit, discharging the bulk capacitor to the power bus.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIGS. 2A-2F each illustrates an example power train of a power supply unit at various stages of operation, in accordance with embodiments of the present disclosure.

DETAILED DESCRIPTION

Figure 1:
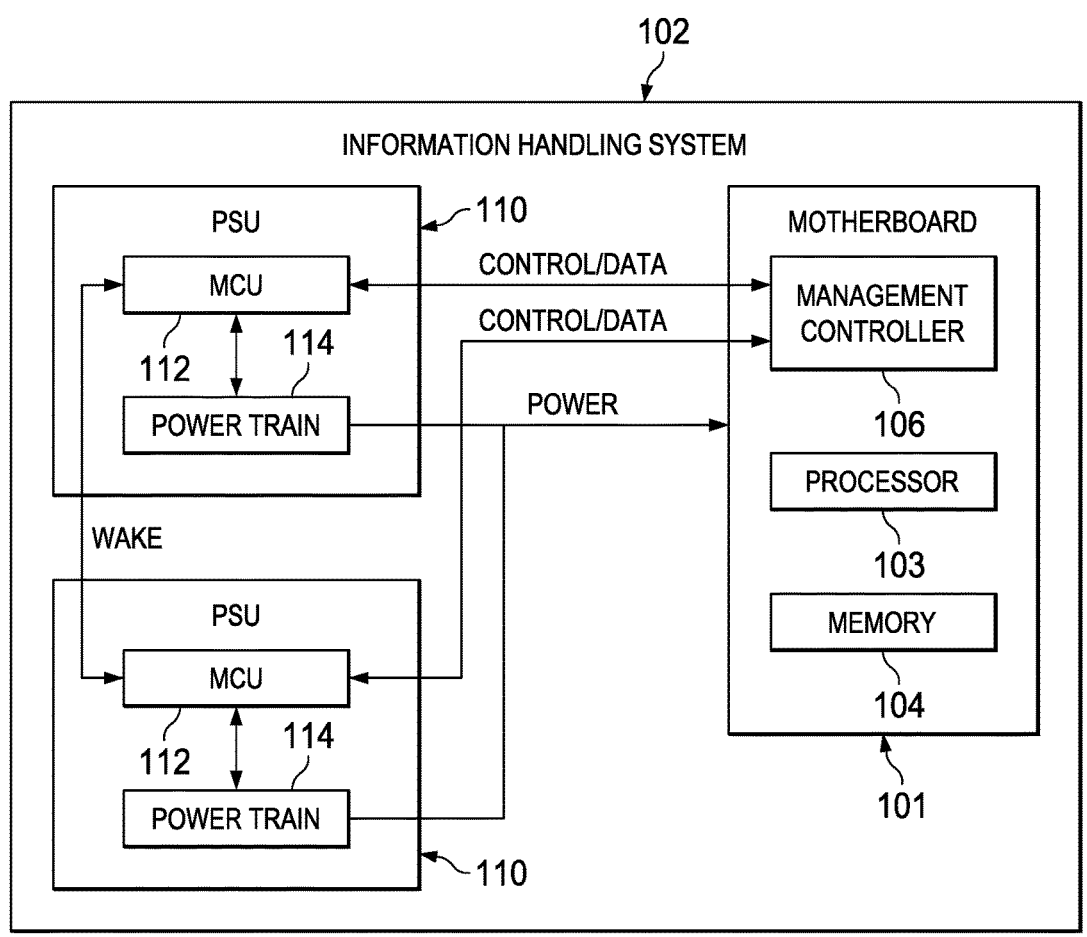
FIG. 1 illustrates a block diagram of an example information handling system, in accordance with embodiments of the present disclosure.

Preferred embodiments and their advantages are best understood by reference to FIGS. 1-2F, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

FIG. 1 illustrates a block diagram of an example of an information handling system 102. As depicted, information handling system 102 may include a plurality of power supply units (PSUs) 110, a motherboard 101, and one or more other information handling resources.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include a processor 103, memory 104, a management controller 106, and one or more other information handling resources.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off. In particular embodiments, memory 104 may comprise a non-volatile memory comprising one or more NVDIMMs.Management controller 106 may be configured to provide out-of-band management facilities for management of information handling system 102. Such management may be made by management controller 106 even if information handling system 102 is powered off or powered to a standby state. Management controller 106 may include a processor, memory, an out-of-band network interface separate from and physically isolated from an in-band network interface of information handling system 102, and/or other embedded information handling resources. In certain embodiments, management controller 106 may include or may be an integral part of a baseboard management controller (BMC) or a remote access controller (e.g., a Dell Remote Access Controller or Integrated Dell Remote Access Controller). In other embodiments, management controller 106 may include or may be an integral part of a chassis management controller (CMC). In some embodiments, management controller 106 may be configured to communicate with a PSU 110 to communicate control and/or telemetry data between management controller 106 and PSU 110. For example, PSUs 110 may communicate information regarding status and/or health of PSUs 110 and/or measurements of electrical parameters (e.g., electrical currents or voltages) present within PSU 110. In addition, in some embodiments, management controller 106 may be configured to, in concert with components of one or more PSUs 110, enable, disable, and/or control the reverse charging functionality of a PSU 110, as described in greater detail below.

Generally speaking, a PSU 110 may include any system, device, or apparatus configured to supply electrical current to one or more information handling resources of information handling system 102. As shown in FIG. 1, PSU 110 may include a microcontroller unit (MCU) 112 and a power train 114. Power trains 114 of PSUs 110 may be coupled at their outputs to a power bus configured to deliver electrical energy to motherboard 101 and other components of information handling system 102. In the embodiments represented by FIG. 1, information handling system 102 may include two PSUs 110 configured in an N+1 redundant configuration. In other embodiments, an information handling system 102 may include any suitable number N of PSUs 102 in any suitable configuration, including an N+2 configuration, an N+3 configuration, up to an N+N configuration.

MCU 112 may comprise a microprocessor, DSP, ASIC, FPGA, EEPROM, or any combination thereof, or any other device, system, or apparatus for controlling operation of its associated PSU 110. As such, MCU 112 may comprise firmware, logic, and/or data for controlling functionality of such PSU 110. As shown in FIG. 1, an MCU 112 may be communicatively coupled to management controller 106 allowing for communication of data and/or control signals between management controller 106 and MCU 112. In addition or alternatively, MCUs 112 of various PSUs 110 may be coupled to one another via a "wake" or "activate" line, which may be used to communicate a signal from one PSU 110 to another PSU 110 to wake or activate it from a sleep state, as shown in greater detail below.

Power train 114 may include any suitable system, device, or apparatus for converting electrical energy received by PSU 110 (e.g., a 120- or 240-volt alternating current voltage waveform) into electrical energy usable to information handling resources of information handling system 102 (e.g., 12-volt direct current voltage source). In some embodiments, power train 114 may comprise a rectifier. In these and other embodiments, power train 114 may comprise a voltage regulator (e.g., a multi-phase voltage regulator). In yet other embodiments, power train 114 may comprise a boost converter. An example implementation of power train 114 is set forth in FIGS. 2A-2F below. Although power train 114 is shown in FIGS. 2A-2F as supporting an alternating-current source, in other embodiments, a power train may support a direct-current source.

In addition to motherboard 101, processor 103, memory 104, management controller 106, and PSU 110, information handling system 102 may include one or more other information handling resources. For example, in some embodiments, information handling system 102 may include more than two PSUs 110.

FIGS. 2A-2F each illustrates a block diagram of an example power train 114 at various stages of operation, in accordance with embodiments of the present disclosure. As shown in FIGS. 2A-2F, power train 114 may include multiple converter stages: a rectifier/power factor correcting (PFC) stage 202, a DC/DC converter stage 204, and a bulk capacitor 206 coupled between an output of rectifier/PFC stage 202 and an input of DC/DC converter stage 204. As shown and described in FIGS. 2A-2F, power train 114 is integral to a single power supply unit 110 deployed in a redundant PSU configuration of information handling system 102 in which one of PSUs 110 is active and delivering power to information handling resources of information handling system 102.

Rectifier/PFC stage 202 may be configured to, in a normal operation of power train 114 depicted in FIG. 2A, and based on an input current $i_{IN}$, a sinusoidal voltage source $v_{IN}$, and a bulk capacitor voltage $V_{BULK}$, shape the input current $i_{IN}$ to have a sinusoidal waveform in-phase with the source voltage $v_{IN}$ and to generate regulated DC bus voltage $V_{BULK}$ on bulk capacitor 206. In some embodiments, rectifier/PFC stage 202 may be implemented as an AC/DC converter using a boost converter topology.

DC/DC converter stage 204 may convert bulk capacitor voltage $V_{BULK}$ to a DC output voltage $V_{OUT}$ which may be provided to a load (e.g., to motherboard 101 and/or other information handling resources of information handling system 102 in order to power such information handling resources). In some embodiments, DC/DC converter stage 204 may be implemented as a resonant converter which converts a higher DC voltage (e.g., 400 V) into a lower DC voltage (e.g., 12 V). As shown in FIGS. 2A-2F, DC/DC converter stage 204 may, in some embodiments, be implemented using a split-phase transformer topology. However, DC/DC converter stage 204 may be implemented using any suitable topology.

In the topology shown in FIGS. 2A-2F, DC/DC converter stage 204 may include a split-phase transformer 208 comprising a primary winding 210 and a secondary winding 212. Secondary winding 212 may comprise a center tap 214 which divides secondary winding 212 into a first portion and a second portion and which center tap 214 is coupled to a positive polarity terminal of the output of DC/DC converter stage 204 via an inductor 216.

Also as shown in FIGS. 2A-2F, a switch matrix comprising switches 218a and 218b may be coupled between bulk capacitor 206 and primary winding 210 in order to control the direction and path of current flow between bulk capacitor 206 and primary winding 210 as described in greater detail below. Switches 218a and 218b may be controlled by control signals (not explicitly shown) communicated from a controller integral to PSU 110, management controller 106, and/or MCU 112 in order to selectively activate (e.g., enable, close, or "turn on") and deactivate (e.g., disable, open, or "turn off") switches 218a and 218b. In addition, switches 220a and 220b may be coupled between a respective terminal (other than center tap 214) of secondary winding 212 and a negative polarity (e.g., ground) terminal of the output of DC/DC converter stage 204 in order to control current through the first portion or the second portion of secondary winding 212 and the direction of current relative to the output terminals of DC/DC converter stage 204.

FIG. 2A depicts power train 114 in a normal mode of operation, in which an alternating-current waveform is available at the input of power train 114. In such mode of operation, bulk capacitor 206 may be fully charged and switches 218a and 220b may be activated and switches 218b and 220a deactivated to allow current to flow as shown by the dotted lines and arrows of FIG. 2A in order to generate desired DC output voltage $V_{OUT}$. During this normal mode of operation, a PSU 110 may be sharing power delivery to information handling resources of information handling system 102 with other PSUs 110 configured in an N+N configuration.

Figure 2C:
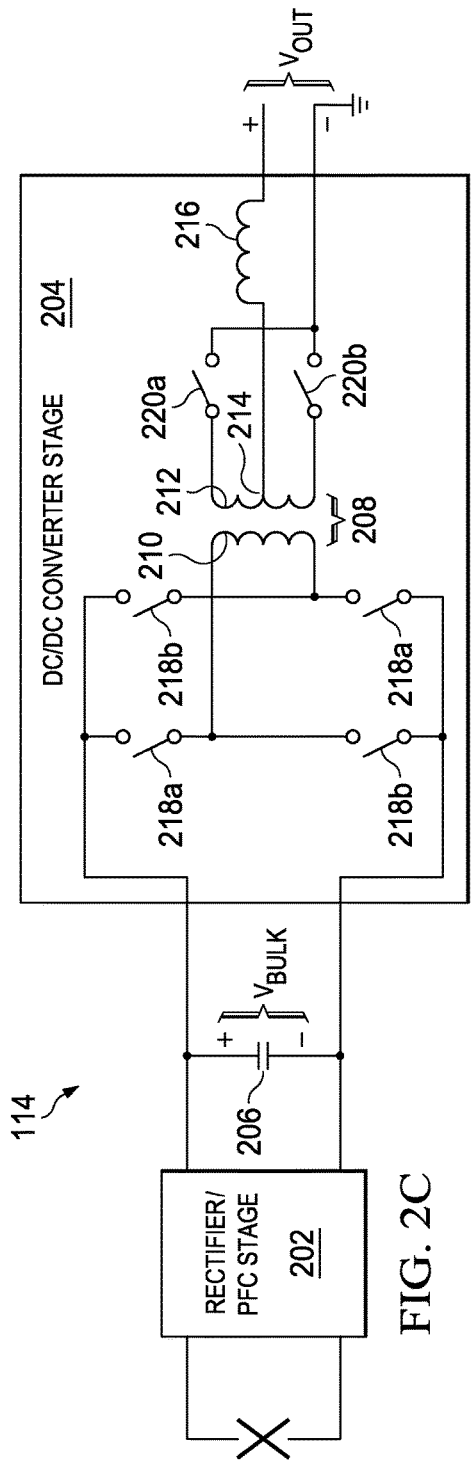

During the normal mode of operation, power train 114 may experience a loss of input power source, as shown in FIG. 2B, whether through a failure of a power grid coupled to the input or failure of input circuitry of power train 114. As a result of such an input loss event, rectifier/PFC stage 202 may no longer be capable of maintaining charge of bulk capacitor 206, and bulk capacitor 206 may discharge, generating current as shown in FIG. 2B until bulk capacitor 206 becomes fully discharged or reaches a voltage level that can no longer sustain operation of DC-DC converter 204, in which no current flows in power train 114, as shown in FIG. 2C. One a PSU 110 enters into a state depicted by FIG. 2C, power delivery to information handling resources of information handling system 102 may be provided by remaining active PSUs 110 present in information handling system 102.

Figure 2D:
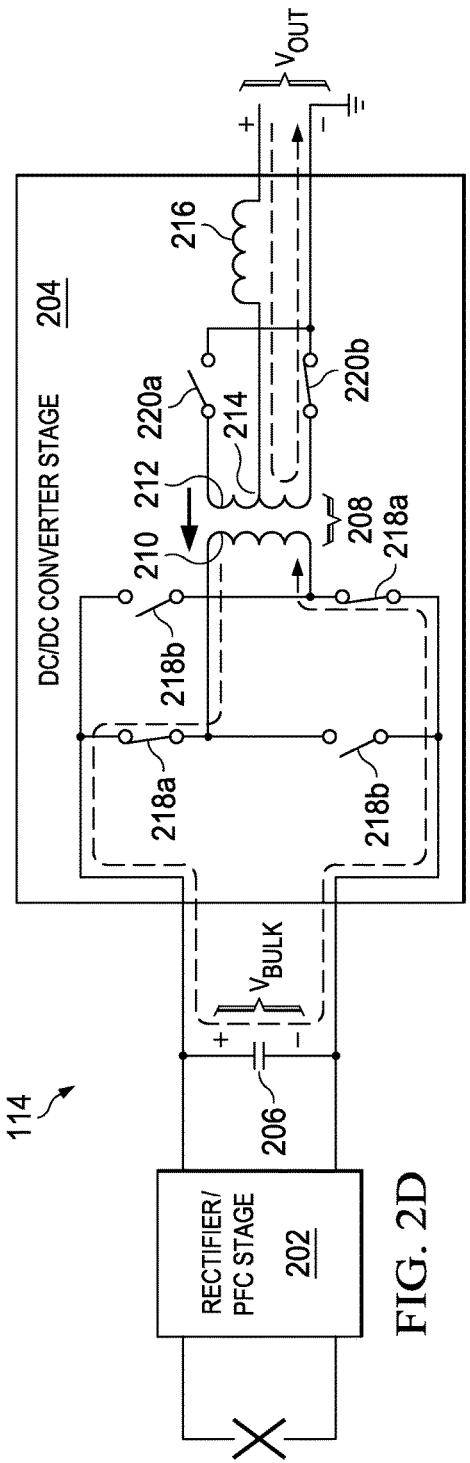

As a result of the loss of input power source, management controller 106 and/or MCU 112 may activate power train 114 to enter a reverse charge mode, as shown in FIG. 2D, in which bulk capacitor 206 is charged from electrical energy present on a power bus coupled to the output of DC/DC converter 204 (e.g., from electrical energy provided to such power bus by another PSU 110 present in information handling system 102). Activation of the reverse charge mode may be triggered in a number of manners. For example, MCU 112 and/or management controller 106 may be coupled to a sensor (e.g., voltage sensor or current sensor) coupled to the input, output, or other part of PSU 110 wherein the sensed parameter is indicative of a loss of input power source (e.g., drop in voltage $V_{IN}$ or $V_{BULK}$ may indicate loss of input power source). Thus, switches 218a and 220b may be activated and switches 218b and 220a deactivated to allow current to flow as shown by the dotted lines and arrows of FIG. 2D in order to charge bulk capacitor 206.

After voltage $V_{BULK}$ has charged to a threshold level via reverse charging in the reverse charge mode (e.g., as determined by MCU 112 and/or management controller 106 reading a sensor measuring a parameter indicative of voltage $V_{BULK}$), power train 114 may enter a sleep or suspended mode of operation as shown in FIG. 2E in which switches 218a, 218b, 220a, and 220b may be deactivated in order to cease charging bulk capacitor 206 and allow bulk capacitor 206 to keep from discharging. In some instances, even with the terminals of bulk capacitor 206 left floating, charge may leak from bulk capacitor 206, thus decreasing voltage $V_{BULK}$. Accordingly, in response to a passage of time and/or in response to voltage $V_{BULK}$ decreasing below a threshold (which may be lower than the threshold used for determining when to cease charging), power train 114 may again enter the reverse charge mode depicted in FIG. 2D in order to restore leaked charge. As a result, bulk capacitor 206 may remain charged and ready for a state change from the sleep mode.

Once in the sleep mode, power train 114 may, other than occasionally entering the reverse charge mode in order to restore leaked charge, remain in the sleep mode until triggered to exit the sleep mode by one or more events. One such event is the return of an alternating current waveform to the input of power train 114, in which MCU 112 and/or management controller 106 may cause power train 114 to return to the normal operation mode depicted in FIG. 2A. Another such event is receiving an indication that another PSU 110 has lost its input power source or otherwise failed such that PSUs of information handling system 102 will no longer be available to provide electrical energy to information handling resources of information handling system 102. Yet another third event may include a sensor coupled to $V_{OUT}$, by which power train 114 may be activated from the sleep mode upon sensing an voltage level outside of a specified range. In some embodiments, such indication may be the receipt of a signal via the wake line shown in FIG. 1 from another PSU 110 that has lost its input power source. In response to such indication, switches 218a and 220b may be activated and switches 218b and 220a deactivated to allow current to flow as shown by the dotted lines and arrows of FIG. 2F in order to provide current to the power bus during a hold-up period of information handling system 102.

By enabling the existing bulk capacitor 206 to be reverse charged as described herein, a PSU 110 that otherwise is unable to output electrical energy to a power bus due to loss of its input power source may remain capable of providing electrical energy in order to enhance hold-up time in information handling system 102. The systems and methods described herein may thus provide increased immunity to brownout, blackout, and dropout conditions. In addition, the systems and methods described herein may reduce inrush current on a bulk capacitor 206 in the reverse charge mode when bulk capacitor 206 is charged.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
    at least one information handling resource; and
    a power supply unit having a bulk capacitor for storing charge and a direct-current-to-direct-current converter stage coupled between the bulk capacitor and a power bus for providing electrical energy to the at least one information handling resource, the power supply unit configured to:
        convert an alternating current waveform received at an input of the power supply unit from an input source into a direct current voltage for delivering electrical energy to:
        responsive to a loss of the input source, charge the bulk capacitor from electrical energy present on the power bus and generated by at least one other power supply unit coupled to the power bus by charging the bulk capacitor via the direct-current-to-direct-current converter stage; and
        responsive to an indication of a failure of the at least one other power supply unit, discharge the bulk capacitor to the power bus by discharging the bulk capacitor via the direct-current-to-direct-current converter stage.

2. The information handling system of claim 1, wherein the power supply unit further comprises a rectifier coupled between the input of the power supply unit and the bulk capacitor.

3. The information handling system of claim 1, wherein the power supply unit further comprises a power factor correction stage between the input of the power supply unit and the bulk capacitor.

4. A power supply unit comprising:
   a bulk capacitor for storing charge;
   an input configured to receive an alternating current waveform received at an input of the power supply unit from an input source;
   a direct-current-to-direct-current converter stage coupled between the bulk capacitor and the power bus; and
   circuitry configured to:
      convert the alternating current waveform into a direct current voltage for delivering electrical energy to a power bus for providing electrical energy to at least one information handling resource;
      responsive to a loss of the input source, charge the bulk capacitor from electrical energy present on the power bus and generated by at least one other power supply unit coupled to the power bus by charging the bulk capacitor via the direct-current-to-direct-current converter stage; and
      responsive to an indication of a failure of the at least one other power supply unit, discharge the bulk capacitor to the power bus by discharging the bulk capacitor via the direct-current-to-direct-current converter stage.

5. The power supply unit of claim 4, wherein the circuitry comprises a rectifier coupled between the input of the power supply unit and the bulk capacitor.

6. The power supply unit of claim 4, wherein the circuitry comprises a power factor correction stage between the input of the power supply unit and the bulk capacitor.

7. A method in a power supply unit for converting an alternating current waveform received at an input of the power supply unit from an input source into a direct current voltage for delivering electrical energy to a power bus for providing electrical energy to at least one information handling resource, the method comprising:
   responsive to a loss of the input source, charging a bulk capacitor of the power supply unit from electrical energy present on the power bus and generated by at least one other power supply unit coupled to the power bus by charging the bulk capacitor from electrical energy present on the power bus comprises charging the bulk capacitor via a direct-current-to-direct-current converter stage coupled between the bulk capacitor and the power bus; and
   responsive to an indication of a failure of the at least one other power supply unit, discharging the bulk capacitor to the power bus by discharging the bulk capacitor to the power bus comprises discharging the bulk capacitor via the direct-current-to-direct-current converter stage.

8. The method of claim 7, wherein the power supply unit comprises a rectifier coupled between the input of the power supply unit and the bulk capacitor.

9. The method of claim 7, wherein the power supply unit comprises a power factor correction stage between the input of the power supply unit and the bulk capacitor.

\* \* \* \* \*

UNITED STATES PATENT AND TRADEMARK OFFICE
CERTIFICATE OF CORRECTION

PATENT NO.        : 9,690,349 B2                               Page 1 of 1
APPLICATION NO.   : 14/814275
DATED             : June 27, 2017
INVENTOR(S)       : Muccini et al.

It is certified that error appears in the above-identified patent and that said Letters Patent is hereby corrected as shown below:

In the Claims

Please amend Claim 7 as follows:
  7. A method in a power supply unit for converting an alternating current waveform received at an input of the power supply unit from an input source into a direct current voltage for delivering electrical energy to a power bus for providing electrical energy to at least one information handling resource, the method comprising:
   responsive to a loss of the input source, charging a bulk capacitor of the power supply unit from electrical energy present on the power bus and generated by at least one other power supply unit coupled to the power bus by charging the bulk capacitor from electrical energy present on the power bus by charging the bulk capacitor via a direct-current-to-direct-current converter stage coupled between the bulk capacitor and the power bus; and
   responsive to an indication of a failure of the at least one other power supply unit, discharging the bulk capacitor to the power bus by discharging the bulk capacitor via the direct-current-to-direct-current converter stage.

Signed and Sealed this
Twelfth Day of September, 2017

Joseph Matal
*Performing the Functions and Duties of the
Under Secretary of Commerce for Intellectual Property and
Director of the United States Patent and Trademark Office*